United States Patent
Lowe et al.

[11] Patent Number: 6,145,879
[45] Date of Patent: Nov. 14, 2000

[54] ARTICLE FOR ENCAPSULATING EXPANDABLE OBJECTS

[76] Inventors: Frank James Lowe, 20 Thurney Drive, Grange Park, Swindon Wiltshire SN5 6EP, United Kingdom; Alan George Ryder, 19 Hadrian's Close, Stratton St Margaret, Swindon Wiltshire SN3 4BE, United Kingdom; Alistair Alfred Preston, 1 Biddel Springs, Highworth, Swindon Wiltshire SN5 6BM, United Kingdom; Brian Jacobs, 1 Wadham Close, Southorp, Near Lachlade, Gloucestershire GL7 3NR, United Kingdom

[21] Appl. No.: 09/142,933

[22] PCT Filed: Mar. 19, 1997

[86] PCT No.: PCT/GB97/00762

§ 371 Date: Jul. 6, 1999

§ 102(e) Date: Jul. 6, 1999

[87] PCT Pub. No.: WO97/34782

PCT Pub. Date: Sep. 25, 1997

[30] Foreign Application Priority Data

Mar. 20, 1996 [GB] United Kingdom .................. 9605841

[51] Int. Cl.[7] .................................................. B60R 21/16
[52] U.S. Cl. ........................................................ 280/743.1
[58] Field of Search .............................. 280/743.1, 730.2

[56] References Cited

U.S. PATENT DOCUMENTS

| | | | |
|---|---|---|---|
| 4,538,740 | 9/1985 | Petersen, Jr. | 215/246 |
| 4,631,098 | 12/1986 | Pithouse et al. | 156/86 |
| 4,940,820 | 7/1990 | Pithouse et al. | 428/34.9 |
| 5,288,103 | 2/1994 | Parker et al. | 280/728 |
| 5,527,062 | 6/1996 | Kreuzer | 280/728.1 |
| 5,730,463 | 3/1998 | Fisher et al. | 280/743.1 |

FOREIGN PATENT DOCUMENTS

| | | |
|---|---|---|
| 0 117 026 A2 | 8/1984 | European Pat. Off. . |
| 0 510 738 A1 | 10/1992 | European Pat. Off. . |
| 0 602 784 A2 | 6/1994 | European Pat. Off. . |
| 41 37 691 A1 | 12/1992 | Germany . |
| 44 11 283 C1 | 5/1995 | Germany . |

*Primary Examiner*—Brian L. Johnson
*Assistant Examiner*—Tony Winner

[57] ABSTRACT

A fabric cover (9, FIG. 2*a*), which is shrinkable at least in part, for encapsulating at least part of an expandable object such as an automotive airbag (1), the fabric cover being provided with a predetermined region of weakness (13), preferably a catch thread holding the edges of a woven fabric together to form a tubular or flat cover, which region of weakness will rupture when the said object expands by greater than a predetermined amount, e.g. in an automobile accident. The region of weakness (13) and preferably fabric regions (11) immediately adjacent thereto may be of a contrasting color to facilitate alignment of the region of weakness in the direction of expansion of the expandable object.

15 Claims, 4 Drawing Sheets

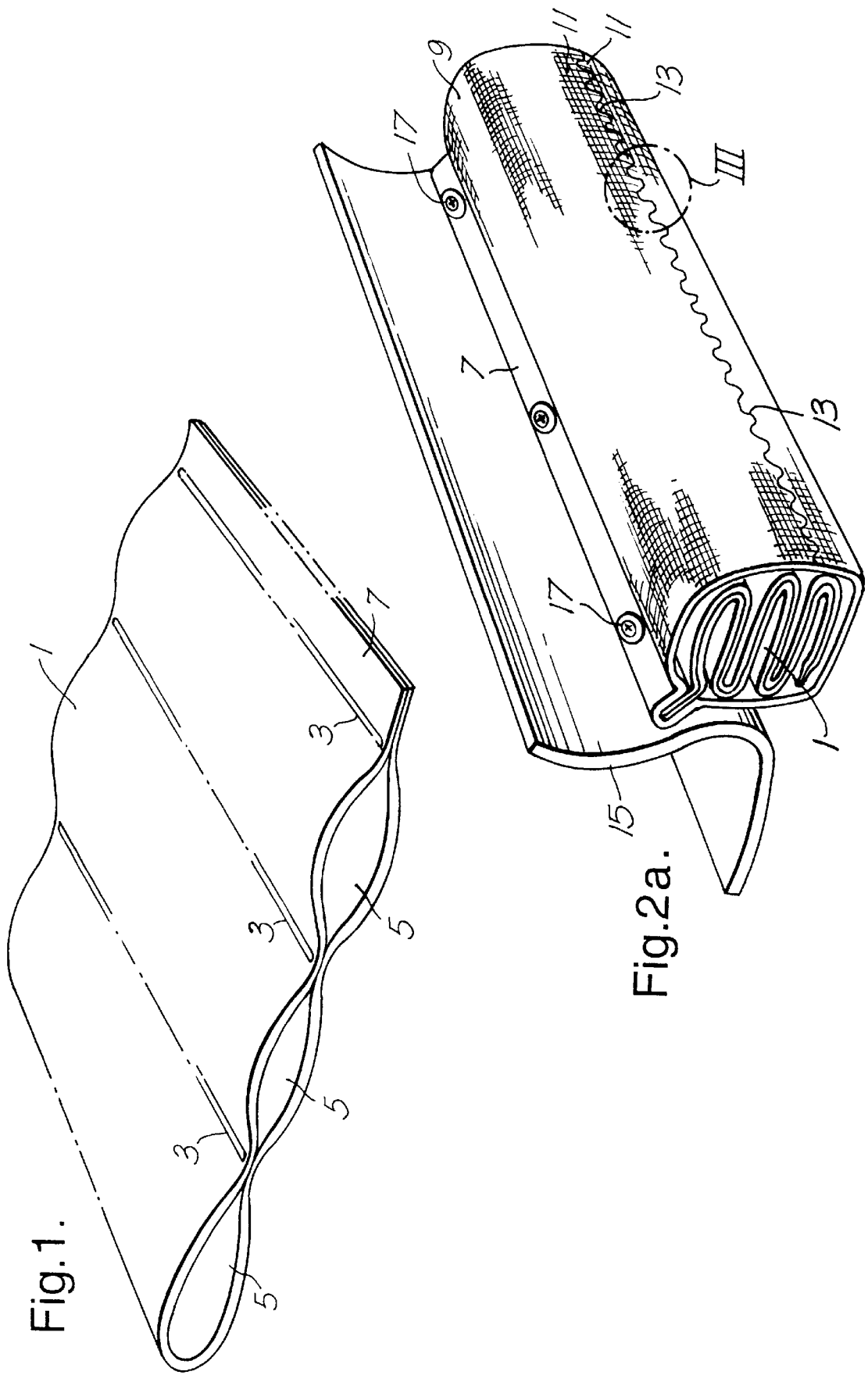

ARTICLE FOR ENCAPSULATING EXPANDABLE OBJECTS

This invention relates to a cover for encapsulating an expandable object, and particularly to a cover for encapsulating a vehicular air bag.

Airbags are commonly provided in vehicles to protect the occupants in the event of an accident. A vehicular airbag typically comprises a gas-inflatable bag, which is retained in its collapsed state within a housing, or other container, in normal use, but which is inflated, and bursts out of its housing in the event of a sudden impact, as would occur, for example, in an accident. An airbag may typically be provided in the car steering wheel, to protect the driver against front impact. Similarly an airbag may be provided in the front dashboard or glove box, on the passenger's side of the vehicle, to protect the front passenger against front impact. More recently, it has been proposed also to mount airbags in, or around, the doors of vehicles, or in or around the sides of seats, to protect the occupants of the vehicles from side impact. Such air bags are described, for example, in an article entitled "Side Impact Airbag Systems" in "Automotive Industries" Febuary '95, at page 104.

The cover of the present invention is suitable for encapsulating inter alia any of the known types of vehicular airbags, or any other conceivable vehicular airbag e.g. rear impact airbags, and airbags used not only internally, but also externally of vehicles.

An important property of any housing, or other container, for a vehicular airbag is that it must open reliably and instantly, preferably in milliseconds, in the event of an impact, in order to allow deployment of the airbag. It is also usually desirable that the airbag housing opens in a predetermined position in order to control the direction of deployment of the airbag. It is known in the art to achieve both these objectives by providing an airbag housing with a pre-determined tear seam, which is weaker than the main body of the airbag housing, and which opens, in the event of impact, to deploy the airbag.

EP-A-0604776 and GB-A-227086, for example, describe airbag housings which are provided with thinner walled sections, or grooves, which act as a line of weakness, and tear open to release the airbag, on inflation of the airbag. Shrink-fitted sheaths having such a line of weakness are described in DE-A4137691 (Mercedes-Benz). Similarly, U.S. Pat. No. 5,288,103 describes an airbag cover which is made from a first thermoplastic material, but which contains an opening filled with a second thermoplastic material of lower tensile strength and elongation strength than the first thermoplastic. The filled opening is provided in the shape of the desired tear-line, and in the embodiments shown is in the shape of an "H".

EP-A-0510738 describes another approach to containing airbags, which does not use predetermined tear lines formed in the housing. In EP-A-0410738, an inflatable gas bag is contained in a steel housing having an open side facing the dashboard. The open side is covered by a hinge flap which can swivel upwards in the direction of the windscreen when the air bag inflates. The open side is covered by a continuous, thin (50 microns), film of polyethylene or polypropylene shrunk around the housing. The film may surround the entire housing, or cover only the opening. On the exterior of the housing, on the section facing the windscreen, a metal strip with saw teeth, or a tooth shaped protrusion, is provided to perforate the thin film, when the air bag inflates.

We have found that a particularly effective container for a vehicular air bag may be provided by a heat-shrinkable fabric cover provided with a predetermined region of weakness, preferably a catch thread as hereinafter described.

The present invention therefore provides a fabric cover, which is shrinkable at least in part, for encapsulating at least part of an expandable object, the cover being provided with a predetermined region of weakness, which will rupture when the said object expands by greater than a predetermined amount The invention also provides a method of encapsulating at least part of an expandable object, the method comprising installing such a shrinkable fabric cover over the said part of the expandable object to restrain the said object in a first, compressed, state.

The cover and method according to the present invention find particular application for encapsulating a vehicular air bag. However they may be used for encapsulating any expandable object, particularly where it is desired to constrain and/or compact the object, and also control deployment of the object. This patent specification will refer primarily to the use of the cover for containing vehicular airbags, but all comments made are also applicable to containing other objects. As examples of other applications, for the cover of the present invention there may be mentioned the encapsulation of various inflatable objects such as buoyancy aids, inflatable bags for use for emergency lifting, inflatable protective packaging or clothing, and the like, and the encapsulation of objects that expand, or are expanded by a foaming material. The cover may also be used to cover objects that are themselves deployed by a backing expandable object. For example oxygen masks in aircraft may be covered by a cover according to the invention, and then deployed by the action of a backing expandable object e.g. a foam, which expands in response to a trigger stimulated in an emergency. Other applications of the cover according to the invention would be apparent to the man skilled in the art.

By "expandable object" we mean any object which changes from occupying a first smaller volume of space to a second larger volume of space. As examples, the expandable object may be in a furled configuration, in its first, smaller volume state, and expanded by unfurling. The furled state of the expandable object is preferably uniform. For example the object, such as an airbag, may be generally planar and arranged in a spirally rolled configuration, or a pleated configuration within the cover. Instead, or in addition the expandable object may comprise an expandable material, e.g. a foam which can expand from its smaller first volume state.

The present invention also provides a cover according to the invention installed on an expandable object prior to its expansion.

The cover of the invention ruptures when the expandable object expands by greater than a predetermined amount. Thus a slight increase in the volume occupied by the expandable object will not cause rupture of the cover. Preferably the cover ruptures when the expandable object expands to occupy a volume that is at least 120%, preferably at least 150% or even at least 200% of its unexpanded state.

The article according to the present invention uses a shrinkable, cover. Preferably the shrinkable cover is heat-shrinkable. Heat-shrinkable articles are well known. They may shrink, on heating, towards an original shape from which they have previously been deformed, or they may shrink to adopt a new configuration, even if they have not been previously deformed. Reference may be made, for example, to U.S. Pat. No. 2,027,962, U.S. Pat. No. 3,086, 242, U.S. Pat. No. 3,597,372, and GB-A-1440524.

Known heat shrinkable articles include plain polymeric materials e.g. polyolefin sheets, fabric covers, and composite sheets comprising fibers or fabrics. In the composite sheets, a fabric comprises polymeric fibers, optionally also in combination with non-polymeric fibers such as glass, are typically laminated with a polymeric matrix, and either the fibers, or the matrix, or both, may be heat shrinkable to render the composite sheet heat shrinkable. Examples of heat shrinkable composite sheets are described, for example, in EP-A-0116393, EP-A-0117026.

Heat shrinkable fabric articles without a laminating polymeric layer are also known. U.S. Pat. No. 3,466,210 (Wareham), for example, describes the use of a woven or braided sleeve which has a heat shrinkable fiber interlaced in the sleeve in the direction of required shrinkage, for use as a protecting layer on an article such as an armature for an electric motor. Another composite sheet is described in U.S. Pat. No. 3,058,863 (Gaines). This describes manufacture of a packaging material, for heavy duty purposes such as tool packaging, comprising laminating polyethylene film to a fabric comprising essentially polyalkylene fibers.

In the production of heat shrinkable articles, the polymeric material (of the sheet, and/or of the fibers in the case of a composite sheet) is usually cross-linked at some stage in the production of the article, to enhance the dimensional shrinkability.

The shrinkable fabric covers used in the article according to the invention may be plain fabric or composite fabric with a polymeric matrix. The covers used in the invention are preferably cross-linked, or comprise cross-linked components.

The shrinkable cover of the present invention may surround the entire expandable object, or only part of the object. For example, the cover may be provided in the form of a tube around the air bag, e.g. for encapsulating a side impact vehicular air bag, and thereby completely surround the air bag. Instead, the cover may be used in conjunction with an open sided housing, the cover being shrunk over the open side of the housing, e.g. for encapsulating a front impact airbag. In both applications, the heat shrinkable nature of the cover may advantageously be used, not only to contain, but also to compact the airbag. This may be advantageous for all types of air bags, but is particularly advantageous for side impact air bags that are to be installed in the door frame or the side frame of the vehicle, or the sides, or other parts, of passenger seats where storage space is limited.

In order to enhance the compaction capability of the heat shrinkable cover of the present invention, the cover preferably has a recovery ratio of at least 1.2:1, preferably at least 2:1. In addition the cover preferably has a thickness of at least 0.08 mm, preferably at least 0.1 mm, more preferably at least 0.2 mm, especially at least 0.4 mm. This thickness allows the cover to compact the airbag, without itself tearing. In the arrangement of EP-A-0510738, the cover merely covers the open side of the housing, and does not act to compact the airbag.

Throughout this specification preferred values of recovery ratios are given sometimes as a numerical ratio, e.g. 2:1, and sometimes as a percentage value, e.g. 20%. Where a numerical ratio is used for recovery ratio, this refers to the following ratio:

$$\frac{\text{Dimension of article before recovery}}{\text{Dimension of article after free recovery}}$$

Where a percentage value is used for recovery ratio this refers to the following ratio:

$$\frac{(\text{Dimension of article before recovery} - \text{Dimension of article after free recovery})}{\text{Dimension of article before recovery}} \times 100\%$$

Any dimension of the article may be measured, since the figure is a ratio, e.g. the diameter or circumference of the tube may be measured for a radially recoverable object. By "free recovery" is meant recovery without any constraint.

The heat shrinkable covers according to the present invention preferably comprise cross-linked materials. For example, in a polymeric fabric, the polymeric fibers making up the fabric may be cross-linked and/or the polymeric sheet or matrix of a composite sheet may be cross-linked. The invention does, however, envisage the use of non cross-linked covers for certain applications, particularly where required recovery ratios are low, for example less than 20%.

In order to enhance further the compaction capability of the cover, where the shrinkable cover is a cross-linked heat shrinkable cover, the cover preferably exerts a recovery force of at least 0.1 MPa, more preferably at least 0.5 MPa, especially preferably a recovery force of at least 1.5 MPa when measured after 4 minutes fully held out in the jaws of a tensile testing machine at a temperature of 30–80° C. above the crystalline melting point of the shrinkable component of the cover.

The cover preferably has the appropriate properties of thickness, recovery ratio, and recovery force, so that it can be installed on an air bag, so that in its compacted state the volume occupied by the air bag is at most 80%, more preferably at most 70%, especially preferably at most 60%, 40% or 20% of its pre-compacted volume.

In addition to enhancing its compaction capability, the minimum thickness of the heat shrinkable cover of at least 0.08 mm, also has an advantage in reducing noise from the air bag during motion of the vehicle. With prior art air bags, of the type described for example in EP-A-0510738, noise caused by rustling of the covering film and air bag has been a problem. Use of a fabric-based cover substantially eliminates this noise. Without in any way limiting the invention, it is thought that fabric-based covers are particularly effective in minimizing noise when used to enclose an expandable object such as an airbag, because of the inherent porosity of fabrics.

Furthermore, thin films, of the type described in EP-A-0510738 have suffered from the problem of shattering into pieces when impacted by the air bag. The small pieces of the film thrown into the vehicle on impact, may cause injury to the passengers. This problem may also be alleviated by using the thicker fabrics containing a region of weakness according to the present invention.

The cover according to the present invention is provided with a predetermined region of weakness. This region may be in a number of shapes and be provided in a number of ways. For some applications the region of weakness is preferably a line of weakness, which may be straight or curved, or any combination thereof.

For the fabric-based shrinkable covers, the line of weakness is advantageously provided by appropriate fabric design. In a preferred embodiment a catch thread is provided to join abutting edges of one or more heat recoverable fabric covers. The catch thread is arranged to rupture when the air bag, or other expandable object, is inflated, or otherwise expanded, and thereby provide a reliable line of weakness. Rupture preferentially at the catch thread region may be effected by making the catch thread of a weaker material than the fiber components of the fabric cover, by making it thinner, e.g. of lower tensile strength and/or lower elongation to break, at least in regions along its length, than the fibers of the fabric, or by the design of the catch thread interengagement with the edges of the fabric cover, or by any combination thereof. The fabric is preferably woven, but other possible fabric designs include knitted, braided, and non-woven designs.

For certain applications, as hereinbefore mentioned, the cover is preferably generally tubular. Where the cover is tubular, the tube may be closed in cross-section or open, i.e. wraparound. Tubular fabric-based covers of closed cross-section may conveniently be manufactured by tubular weaving, needle insertion weaving, knitting etc., or by wrapping a flat sheet into a tube, and closing, e.g. by sewing or welding, overlapping or abutting longitudinal edges. Wraparound fabric based covers are conveniently manufactured as flat sheet.

Where the cover is a tubular woven fabric, the predetermined region of weakness is preferably provided by a catch thread which extends as one of the warp yarns extending in the longitudinal direction of the tubular cover. The catch thread preferably engages weft yarns which extend in the circumferential direction of the tubular cover, and which then loop back on themselves around the said catch thread. Such a fabric design may conveniently be made by needle insertion weaving.

Where a catch thread is used, the tensile strength of the catch thread is preferably in the range 3 to 5 Newtons, preferably about 4 Newtons, and the elongation to break of the catch thread is preferably in the range 15 to 25%, preferably about 20%.

Fabric constructions may conveniently be modified to vary the mechanical properties across the sheet. For example, the fiber density at edges of a fabric sheet may conveniently be increased to increase the strength of those edges. This may be advantageous, for example, where the cover edges are to be anchored to a vehicle frame, or, as another example, to provide reinforced edges for ease of sewing, or other joining means As another possibility a flat fabric-based cover may be wrapped around a generally elongate object such as an airbag, then sewn, or otherwise secured in place around the expandable object, prior to shrinkage of the cover.

In preferred embodiments the region of weakness, and/or the section of the cover which immediately surrounds the region of weakness of the cover, is a different color, or otherwise easily distinguished, from the remainder of the cover. In one embodiment, most of the cover is one color, and the region of weakness, and/or the section of the cover immediately surrounding the region of weakness, is a different color. This makes it particularly easy to see the region of weakness. This may be advantageous during installation of the cover where it is desired that this region is oriented in a particular direction. For example, for a passenger protection vehicular airbag cover, the region of weakness should point towards the passenger(s) to be protected. Where a fabric-based cover joined by a catch thread is used, the catch thread is preferably a different color from the other fibers of the fabric, and/or the fibers of the fabric cover immediately adjacent to the catch thread are a different color from the remaining body of the fabric, e.g. forming easily visible bands or stripes which readily identify the location of the catch thread.

For other applications the cover is preferably generally planar. For fabric-based covers, these may initially be manufactured in planar form, or they may be manufactured as a tube (joined by a catch thread) and then slit longitudinally at a point away from the catch thread, to form a sheet with a line of weakness extending along its length.

A number of designs are possible for interengagement of a catch thread with the edges of a fabric shrinkable cover. A particularly preferred arrangement for joining edges of a woven fabric is to use a catch thread in a needle loom selvedge system of the type described in FIG. 1 of BS (British Standard) 7141: Part 1 1991. The British Standard describes a locking thread selvedge system for retaining the weft fibers at the selvedge of a single woven fabric. It would be obvious to the skilled man how to use this selvedge locking thread as a catch thread to join together looped weft fibers of two abutting woven fabric edges. The specific design of catch thread equivalent to the quoted BS locking thread is illustrated in the drawings of the present specification. Another possible catch thread design that can be used is equivalent to spool type interlocking locking thread described in FIG. 2 of the above quoted BS. As adapted to join two abutting fabric edges, this would simply be a thread which passed alternately through edge weft loops of a first fabric edge and then a second fabric edge.

Where two abutting fabric edges are joined by the catch thread, these edges may be provided (i) by longitudinal edges of a single fabric piece wrapped into a tubular configuration, (ii) by edges of two or more separate fabric pieces, arranged adjacent to each other, or (iii) by edges of two or more previously separate fabric pieces which have been fastened to each other by some means, preferably by some mechanical penetrating means such as sewing, stapling or riveting.

For a woven fabric joined by a catch thread, preferred materials for the fabric are as follows: weft thread—heat shrinkable polyolefin, e.g. high density polyethylene, having a shrink ratio of 10×; warp thread-polyethylene terephthalate; catch thread—polyolefin, e.g. high density polyethylene, but of smaller diameter than the high density polyethylene of the weft fibers of the fabric.

Other suitable materials that can be used include the following: nylon; acrylics; aromatic polyamides; polypropylene; cotton; wool; rayon (regenerated cellulose); cellulose acetate; pyrolised polyacrylonitrile; carbon; homopolymer, modified polymer, or copolymers of acrylics; fluoropolymers; and glass.

Another fabric structure that could be used is a weft insertion warp knitted fabric with heat shrinkable fibers as the weft inlay. In one embodiment according to the invention, the heat shrinkable fibers are about 0.4 mm diameter HDPE, the majority of the knitted loops in the warp direction are two fold, 167 Tex, Kevlar 29 (Trademark of Dupont) with a single wale (volume of stitches) of three fold 16.7 Tex, polyethylene terephthalate as the line of weakness. In a particularly preferred embodiment, the structure is sewn or stapled around an expandable object such as an airbag. When sewn, a strong lock stitch of Kevlar (five fold, 22 Tex) is preferably used so that the fault line is in the 3 fold/16.7 Tex Polyethylene terephthalate.

Yet another fabric structure that could be used is a flat woven sheet. In a flat woven sheet a line of weakness may be provided by a sewing thread stitched to make the flat sheet into a tube. A single thread chain stitch of two fold 22 Tex Nomex (trade name) with a breaking strength of 10 Newtons may be used to sew the flat woven tube into a sheet.

As used herein "Tex", which is the I.S.O designation for Linear Density of Textile strands, yarns, fibers etc., is the weight in grams of 1000 metres of product.

Where the shrinkable cover is a composite cover comprising fibrous components and a polymeric matrix, then a combination of the above design features referred to for plain polymeric, shrinkable covers and for fabric shrinkable covers, may be used to provide the desired region of weakness.

Fabric shrinkable covers, or composite covers containing fibers or fabrics are particularly advantageous for use as shrinkable air bag covers, since the covers are particularly resistant to tearing on shrinkage.

Tear resistance of the shrinkable cover is particularly important for several reasons. First the cover is desirably installed around the air bag, or other expandable object, to compact it, by shrinkage, preferably by heat. It is therefore important that the cover does not tear prematurely during this shrinkage process. Secondly, for some applications, e.g. some airbag applications, it is important to anchor the air bag to the vehicle frame, so that the air bag does not fly into the vehicle when deployed, since this could injure the occupants. By providing a tear resistant cover, this cover may conveniently be anchored to the vehicle frame by a mechanical penetrating fixing means, such as a bolt, rivet, staple or screw or the like, passing through the air bag cover. For these reasons, therefore, fabric shrinkable covers, or fibrous-based shrinkable covers are particularly preferred, since any splits in the fabric around the mechanical penetrating fixing means are not propagated during installation by shrinkage (e.g. heat shrinkage for a heat shrinkable cover) of the cover. The good tear resistance capabilities of fabric materials are known.

Anchorage of an airbag and also its cover, at various points is important to avoid injury to passengers. As an example, a side impact airbag designed to protect a front passenger, and extending diagonally across the window of the front door, may be anchored at two points, at each end of an airbag encased in a generally tubular cover. As another example an airbag deploying vertically downwards in a sheet like configuration along the entire side length of a vehicle may be anchored to the top of the side frame of the vehicle, together with its encapsulating cover, at several (e.g. four to ten) points along its length.

In preferred tubular fabric-based covers according to the invention, a draw thread may be included, within the tubular cover, during fabric manufacture. This draw thread may conveniently be used to pull elongate expandable objects easily into the tubular cover.

As mentioned above, the shrinkable cover is preferably shrunk around the air bag to compact the air bag. During this operation, the whole, or only part of the shrinkable cover may be shrunk. For a heat shrinkable cover, for example, it may be desirable, to heat only those regions away from the region of weakness of the heat-shrinkable cover.

Embodiments of the present invention will now be described, by way of example, wherein:

FIG. 1 is a perspective view of a side impact vehicular air bag;

FIG. 2a is a perspective view of the air bag of FIG. 1 encapsulated in a cover according to the invention, and bolted to a vehicle frame.

FIG. 2b is a perspective view of an airbag cover that can be used in place of that shown in FIG. 2a;

FIG. 3 is an enlarged view of Section III taken through the region of weakness of the article shown in FIG. 2a.

Figure 2B:
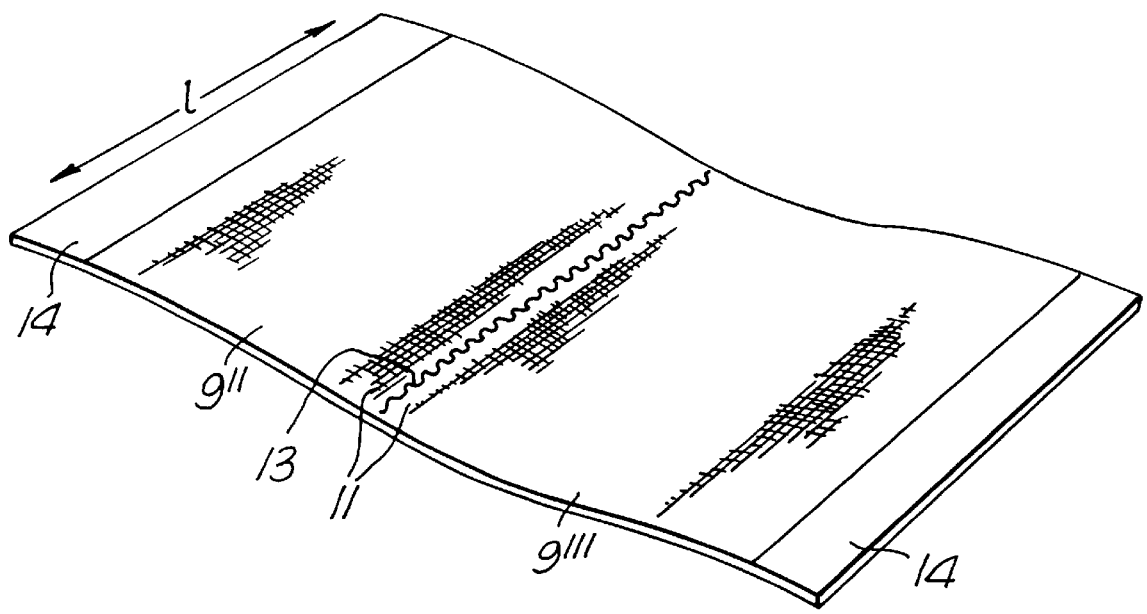

Referring now to the drawings, FIG. 1 shows a typical design of a side impact air bag 1 designed to protect a front seat passenger. It is generally elongate in structure (as indicated by the dotted lines), and typically measures about 1.2 metres in length by about 20 cm in width. The air bag is bonded along lines 3 to form separate channels 5. Each channel 5 is in communication with a gas chamber 7 (not shown). Gas is released into channels 5 in the event of an accident to inflate the air bag. The air bag 1 is also provided with a flange 7 along one side, for convenient attachment to the vehicle frame. Other side impact airbags, designed to extend along the entire length of the passenger compartment, are typically larger, e.g. about 2.4 metres in length by about 50 cm in width. Their design is otherwise similar to that described above.

FIG. 2a shows the air bag 1 of FIG. 1 folded into a concertina shape, and encapsulated by a shrinkable tubular fabric article 9 according to the present invention. The fabric article 9 is woven and tubular. It comprises multifilament polyethylene terephthalate fibers in the warp, running longitudinally along the tube, and heat shrinkable high density polyethylene monofilament fibers in the weft, extending generally circumferentially. The shrinkable fibers have a recovery ratio of about 8:1 to 10:1 (8×to 10×. Extending along the tubular article 9, in the warp direction, is thin catch thread 13, comprising a shrinkable high density polyethylene yarn. The interengagement of the catch thread 13, and the weft fibers of fabric 9, is shown and described in more detail with reference to FIG. 3.

The warp fibers of the fabric of cover 9 immediately adjacent the catch thread 13 have been identified by the reference numeral 11 for identification purposes. The catch thread 13, and/or the warp fibers 11, and/or further warp fibers adjacent warp fibers 11 may be a different color from the other fibers of fabric, in order to make the region of weakness provided by catch thread 13 readily visible.

The fabric article 9 has been heated to shrink it around the air bag 1, to compact the air bag into its concertina configuration, and to maintain it in that configuration. Typically, once shrunk, there is between 50–80% unresolved recovery in the cover, i.e. if allowed to recover freely the cover would recover between 50 and 80% more. The encapsulated air bag 1 is secured to part of the vehicle frame 15 by bolts 17 which pass through the fabric cover 9 surrounding the air bag 1. The fabric area through which bolts 17 pass may be reinforced, e.g. by increasing the fiber density (not shown).

FIG. 2b shows an alternative flat construction of fabric pieces 9", 9"' joined by a warp catch thread 13. The free edges 14 of the sheets 9", 9"' comprise an increased number of fibers in the warp, longitudinal direction 1. This reinforces the edge regions 14. As in FIG. 2a, the warp fibers immediately adjacent the catch thread 13 are indicated by reference numeral 11. The sheets 9", 9"' may be wrapped into a tubular configuration and bolts 17 passed into vehicle frame 15 through the edge regions 14 of the sheets 9", 9"' in a manner similar to that described in FIG. 2a. Edges 14 may be brought together in a lap configuration, or as a flange extending outwardly or inwardly of the tube so formed.

The properties of the fabric making up the preferred design of the air bag cover 9 of FIGS. 1 and 2a are as follows:

| Weave Design | Yarn Sett | Material | Thickness | Elong. to break | Break load (room temp) |
|---|---|---|---|---|---|
| Plain weave (tubular) | Warp 8 ends/cm on each surface | Polyethylene Terephthalate (multifilamnt) | 16.7 tex 7 ply | 35% | 273 N/cm in warp direction |
| | Weft 5 double insertions per cm on each surface | HDPE (monofilamnt) | 47 tex 0.25 mm diameter | 20% | 178 N/cm in weft direction |

Figure 3:
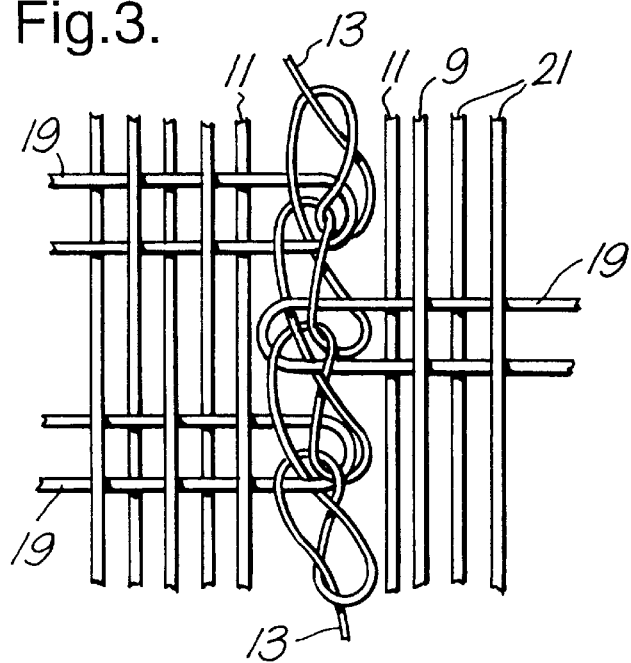

FIG. 3 shows in enlarged view the interengagement of the catch thread 13 with the weft fibers 19 of the fabric cover 9. The interengagement shown corresponds to the needle loom selvedge system of the type described in FIG. 2 of BS 7141, adapted for joining two fabric edges. In FIG. 3, general warp fibers are indicated by reference numerals 21, and the warp fibers immediately adjacent the catch thread 13 are indicated by reference numeral 11 as in FIGS. 2a and 2b.

Figure 4:
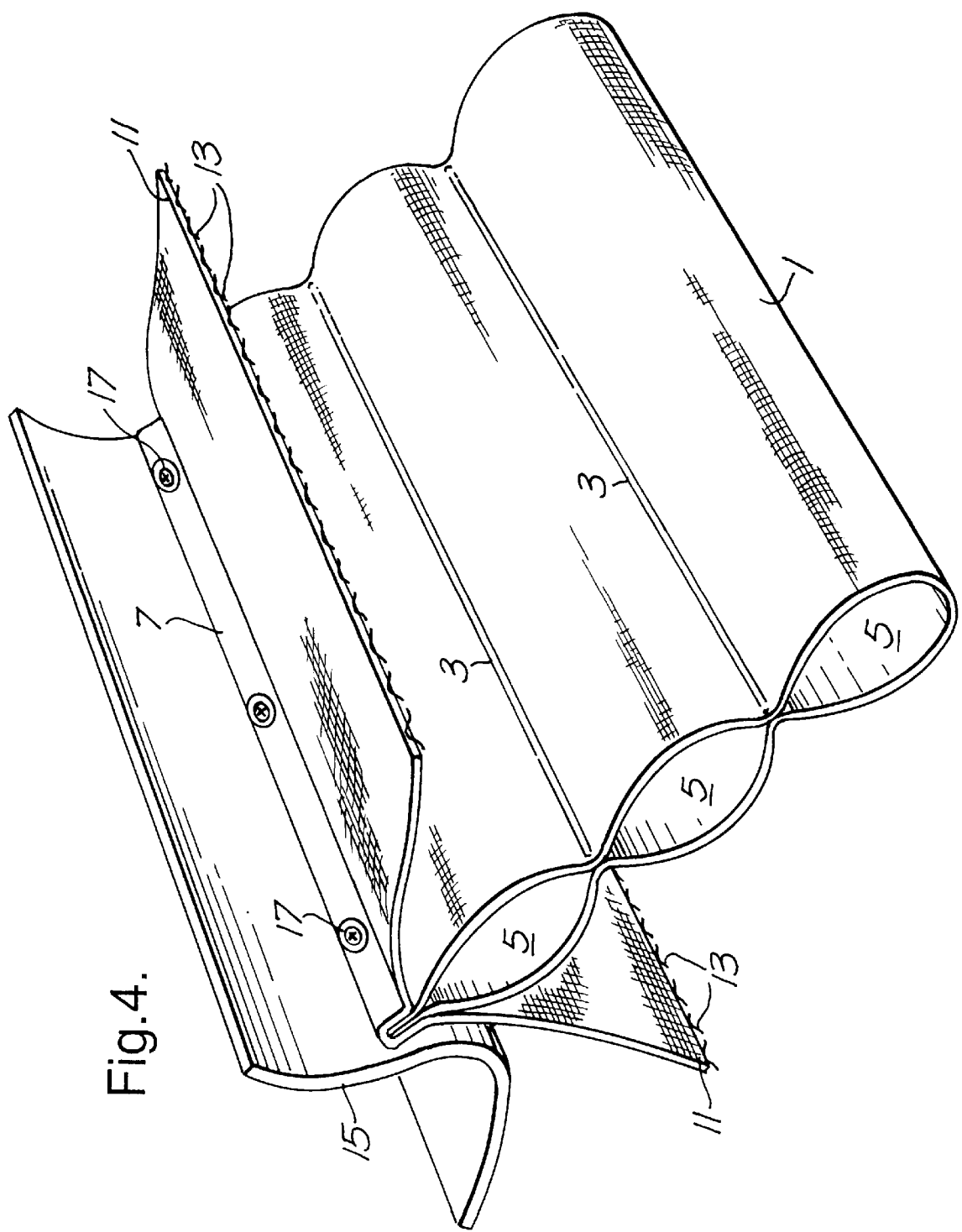
FIG. 4 is a perspective view showing inflation of the air bag of FIG. 2a, and consequent rupture of the cover encapsulating the airbag of FIG. 2.

FIG. 4 is a schematic cross-section view showing the deployment of the air bag 1 from the cover 9 of FIG. 2a, in the event of an accident. Gas is introduced into chambers 5 of the air bag, inflating them, so that the air bag volume exceeds that of the containing fabric cover 9. The catch thread 13 is therefore broken by the expanding air bag, and the longitudinal edges 11 of the fabric sleeve are burst apart. The cover 9 therefore splits along edges 11 to allow the air bag 1 to open into the vehicle. The air bag 1 remains anchored to the vehicle 15 by the bolts 17, preventing the air bag flying around the vehicle and injuring passengers.

Figure 5:
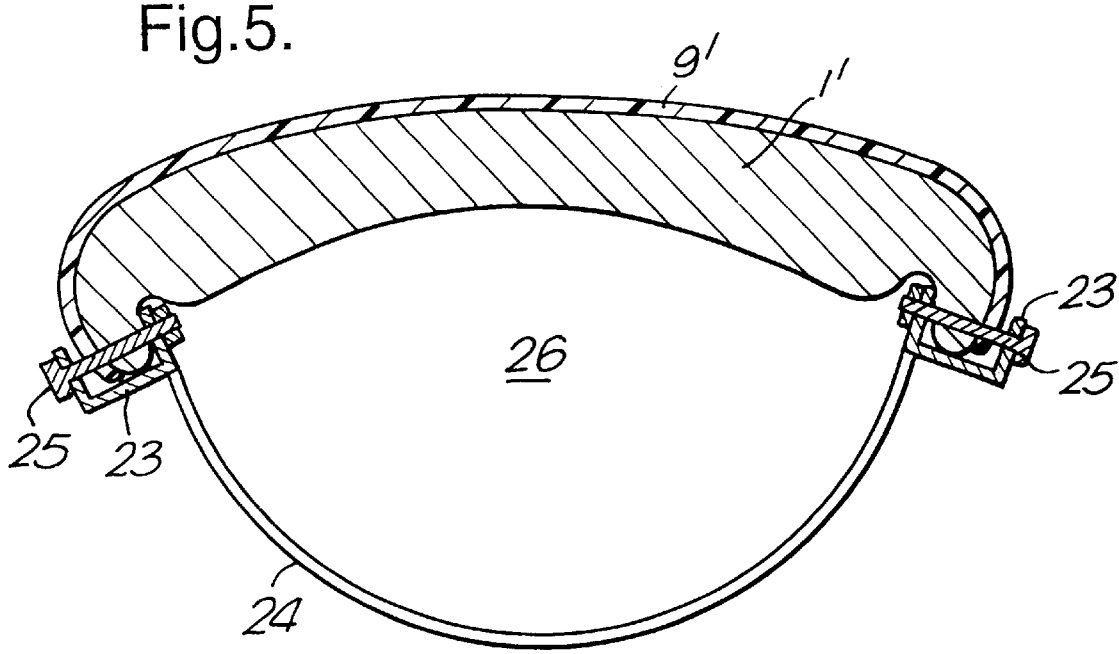
FIG. 5 is a cross-sectional view through a front impact air bag encapsulated by an article according to the present invention.
Figure 6:
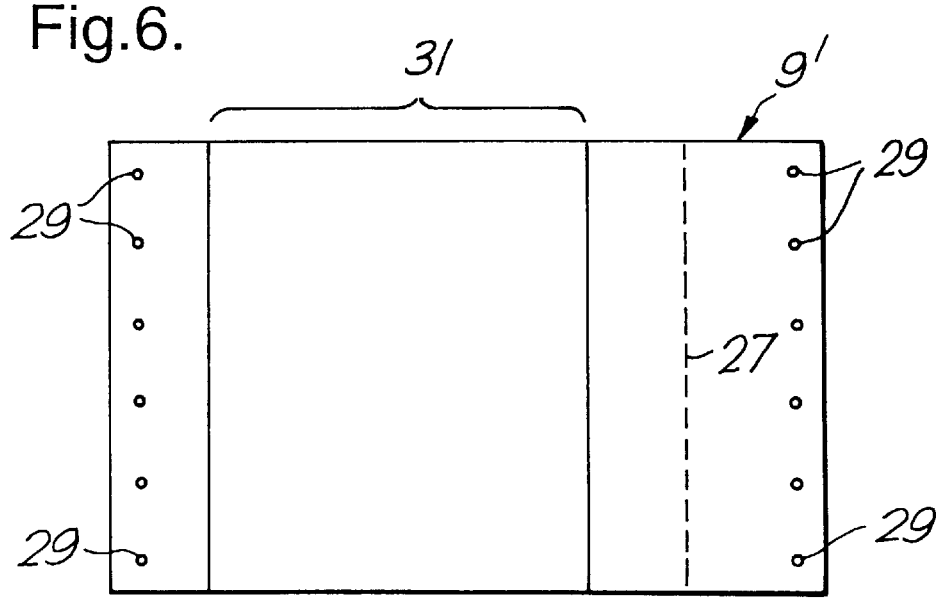
FIG. 6 is a plan view through the article used in FIG. 5.

FIG. 5 shows an alternative arrangement where a front impact air bag 1' is retained by a covering sheet 9' secured to part of the vehicle 23, and to the back housing 24 of gas chamber 26, by bolts 25. As shown in FIG. 6, the sheet 9' is provided with a line of weakness 27 as hereinbefore described. The sheet is also provided with apertures 29 for receiving the bolts 25. The fabric sheet may be similar to that shown in FIG. 2b, with the bolts 25 passing through the reinforced edges 14.

The sheet 9' is installed on the air bag 1' to compact the air bag, by heating a strip 31 only of the sheet 9' Recovery during installation is preferably limited to a maximum of 5% to reduce the risk of tearing the sheet 9' during installation.

In the event of an accident, gas from chamber 26 inflates air bag 1', the sheet 9' tears along fault line 27, and the air bag is thus deployed.

What is claimed is:

1. A fabric cover, which is shrinkable at least in part, for encapsulating at least part of an expandable object, the cover being provided with a predetermined region of weakness, which will rupture when the said object expands by greater than a predetermined amount; wherein the cover comprises one or more woven fabric pieces, and the predetermined region of weakness is provided by a catch thread interengaging weft loops at abutting edges of a single wrapped fabric; or two adjacent separate abutting woven fabrics.

2. A cover according to claim 1, comprising a composite sheet containing a fabric and a polymeric matrix.

3. A cover according to claim 1, wherein the fabric is heat shrinkable.

4. A cover according to claim 3, wherein the fabric comprises polymeric fibers that are heat shrinkable.

5. A cover according to claim 1 which has a shrinkage ratio of at least 1.5:1.

6. A cover according to claim 1 which has a thickness of at least 0.08 mm.

7. A cover according to claim 1, which has a recovery force of at least 0.1 MPa.

8. A cover according to claim 1, wherein the catch thread has a tensile strength, at 23° C., lower than the tensile strength at 23° C. of the weft fibers of the or each fabric.

9. A cover according to claim 1, wherein the catch thread has a diameter less than the diameter of the weft fiber or each fabric.

10. A cover according to claim 1, wherein the region of weakness is a different color from the surrounding region of the cover.

11. A cover according to claim 1, wherein a section of the cover immediately adjacent the region of weakness is a different color from the remainder of the cover.

12. A cover according to claim 1, in combination with an expandable object, which can be furled or folded or otherwise compacted in size.

13. A cover according to claim 12, which has been shrunk around the object to compact the said object.

14. A method of encapsulating at least part of an expandable object, the method comprising installing a shrinkable cover according to claim 1 over the said part of the expandable object to restrain the said object in a first, compressed, state, the cover being provided with a predetermined region of weakness, which will rupture when the said object expands, from a first volume, by greater than a predetermined amount.

15. A fabric cover, which is shrinkable at least in part, for encapsulating at least part of an expandable object, the cover being provided with a predetermined region of weakness, which will rupture when the said object expands by greater than a predetermined amount; wherein the cover is tubular and comprises a woven fabric, the predetermined region of weakness being provided by a catch thread which extends as one of the warp yarns extending in the longitudinal direction of the tubular cover, which catch thread interengages weft loops which extend in the circumferential direction of the tubular cover, and which loop back on themselves around the said catch thread.

* * * * *

UNITED STATES PATENT AND TRADEMARK OFFICE
CERTIFICATE OF CORRECTION

PATENT NO.   : 6,145,879
DATED        : November 14, 2000
INVENTOR(S)  : Lowe et al Page 1 of 1

It is certified that error appears in the above-identified patent and that said Letters Patent is hereby corrected as shown below:

<u>Title page,</u>
Section [76] Inventors, replace "Alistair Alfred Preston" by -- Alistiar Alfred Preston Sutherland --.

Signed and Sealed this

Twenty-eighth Day of August, 2001

*Attest:*

*Nicholas P. Godici*

*Attesting Officer*

NICHOLAS P. GODICI
*Acting Director of the United States Patent and Trademark Office*